(12) United States Patent
Weigl

(10) Patent No.: US 12,257,643 B2
(45) Date of Patent: Mar. 25, 2025

(54) DEVICE AND METHOD FOR INCREASING THE SPEED AND INCREASING THE STABILITY OF THE WELDING PIN IN FRICTION STIR WELDING

(71) Applicant: Grenzebach Maschinenbau GmbH, Asbach-Baeumenheim (DE)

(72) Inventor: Markus Weigl, Donauwoerth (DE)

(73) Assignee: GRENZEBACH MASCHINENBAU GMBH, Asbach-Bäumenheim (DE)

( * ) Notice: Subject to any disclaimer, the term of this patent is extended or adjusted under 35 U.S.C. 154(b) by 0 days.

(21) Appl. No.: 18/499,568

(22) Filed: Nov. 1, 2023

(65) Prior Publication Data

US 2024/0058890 A1 Feb. 22, 2024

Related U.S. Application Data

(62) Division of application No. 17/295,375, filed as application No. PCT/DE2020/000207 on Sep. 11, 2020, now Pat. No. 11,883,901.

(30) Foreign Application Priority Data

Sep. 11, 2019 (DE) .................. 10 2019 006 413.5

(51) Int. Cl.
*B23K 20/00* (2006.01)
*B23K 20/12* (2006.01)

(52) U.S. Cl.
CPC .............................. *B23K 20/1255* (2013.01)

(58) Field of Classification Search
CPC ................... B23K 20/1255; B23K 20/122; B23K 20/123; B23K 20/1225; B23K 20/125; B23K 20/126; B23K 20/26
See application file for complete search history.

(56) References Cited

U.S. PATENT DOCUMENTS 6,068,178 A * 5/2000 Michisaka ........... B23K 20/126
228/2.1
6,237,835 B1 * 5/2001 Litwinski ............. B23K 20/126
228/2.1
(Continued)

FOREIGN PATENT DOCUMENTS

CN 108817644 11/2018
CN 108857036 11/2018
(Continued)

*Primary Examiner* — Erin B Saad
(74) *Attorney, Agent, or Firm* — DUANE MORRIS LLP; Gregory M. Lefkowitz; Randall C. Pyles

(57) ABSTRACT

The invention relates to a device and method for increasing the speed and increasing the stability of the welding pin in friction stir welding with the following device features: a) a tool drive has a retaining flange for a cone-shaped tool cover with a union nut; b) an annular retaining ring surrounds a pin shank with a tool shoe secured to the diameter of the retaining ring, wherein the tool shoe has a smoothing and compressing surface in the region of the pin tip for smoothing the weld seam, wherein the pin shank has the width of the tool shoe; c) the pin tip has an annular friction surface which surrounds a screw conveyor for the output of material transport from the pin tip, which has a thread running in the opposite direction to the thread of the pin tip.

11 Claims, 6 Drawing Sheets

(56) References Cited

U.S. PATENT DOCUMENTS

Figure 1:
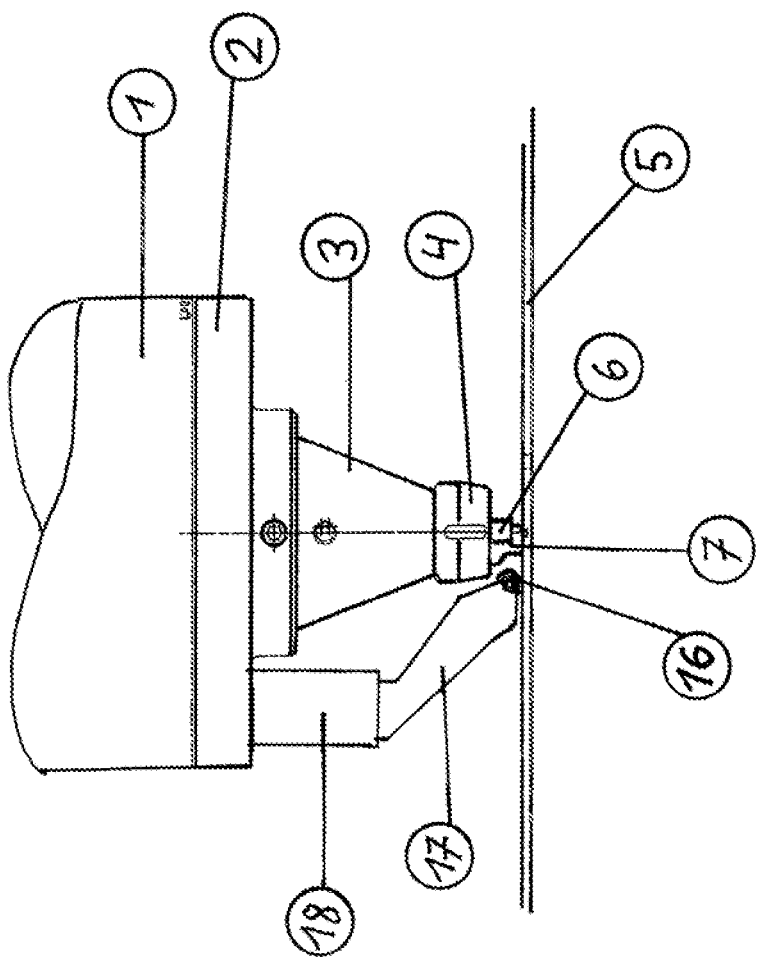

| | | | | |
|---|---|---|---|---|
| 6,311,889 | B1* | 11/2001 | Ezumi | B23K 20/1245 228/119 |
| 6,742,696 | B2* | 6/2004 | Thompson | B23K 20/1255 228/2.1 |
| 6,997,369 | B2* | 2/2006 | Hamada | B23K 20/122 228/103 |
| 7,028,880 | B2* | 4/2006 | Narita | B23K 20/126 228/112.1 |
| 9,956,644 | B2 | 5/2018 | Foerg | |
| 10,953,489 | B2 | 3/2021 | Fröhlke | |
| 11,883,901 | B2* | 1/2024 | Weigl | B23K 20/1255 |
| 2003/0057258 | A1* | 3/2003 | Ishida | B23K 20/1245 228/175 |
| 2003/0209586 | A1* | 11/2003 | Thompson | B23K 20/123 228/2.1 |
| 2004/0170747 | A1 | 9/2004 | Sekula | |
| 2005/0092817 | A1* | 5/2005 | Baumann | B25B 5/00 228/212 |
| 2006/0102689 | A1* | 5/2006 | Trapp | B23K 20/126 228/2.1 |
| 2008/0048005 | A1* | 2/2008 | Forrest | B23K 20/1245 228/101 |
| 2009/0120995 | A1 | 5/2009 | Hallinan | |
| 2016/0074957 | A1 | 3/2016 | Nishida | |
| 2017/0080527 | A1* | 3/2017 | Weigl | B23K 20/1255 |
| 2018/0071861 | A1* | 3/2018 | Masaki | B23K 20/1245 |
| 2019/0262935 | A1* | 8/2019 | Fröhlke | B23K 20/122 |
| 2022/0001487 | A1* | 1/2022 | Weigl | B23K 20/1255 |

FOREIGN PATENT DOCUMENTS

| | | |
|---|---|---|
| DE | 202018001178 | 3/2018 |
| GB | 2306366 | 5/1997 |
| JP | H11156560 | 6/1999 |
| JP | 2009208116 | 9/2009 |
| JP | 2014223639 | 12/2014 |

* cited by examiner

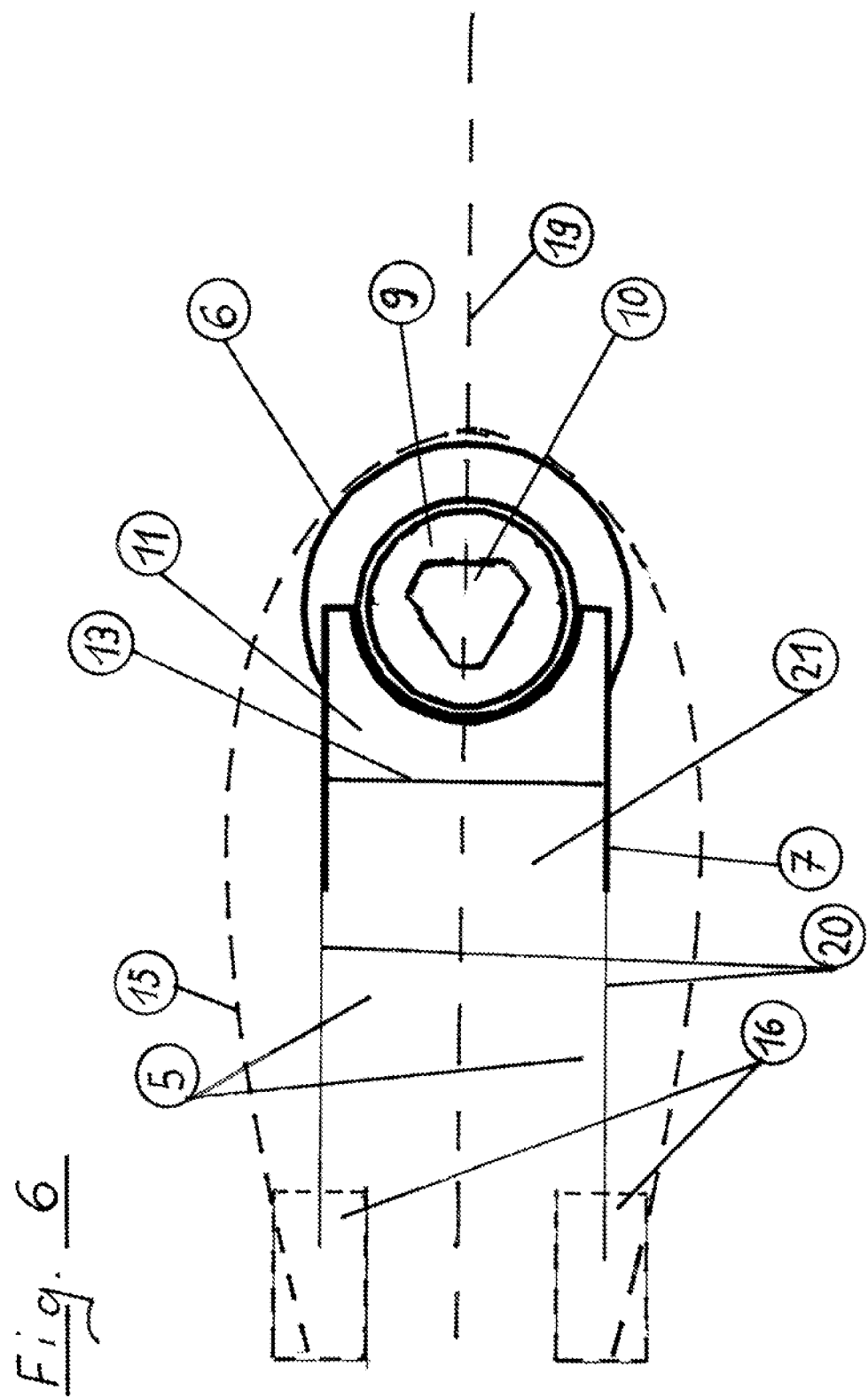

DEVICE AND METHOD FOR INCREASING THE SPEED AND INCREASING THE STABILITY OF THE WELDING PIN IN FRICTION STIR WELDING

This application is a divisional application of U.S. patent application Ser. No. 17/295,375, filed May 19, 2021, which is a § 371 national stage entry of International Application No. PCT/DE2020/000207, filed on Sep. 11, 2020, which claims priority to German Patent Application No. 10 2019 006 413.5, filed on Sep. 11, 2019, the entire contents of which are incorporated herein by reference.

The application relates to a device and to a method for increasing the speed and increasing the stability of the welding pin in friction stir welding.

In friction stir welding, frictional heat is generated in the joining region of the materials to be connected by means of the friction between a rotating tool which at the same time is moved translationally and to which pressure is applied. The tool is moved along the joining region and stirs the plasticized material in the interior of the seam of the materials to be connected that are butting against one another, wherein the applied pressure presses the plasticized material together. At the end of the weld seam created, the tool is withdrawn from the region of the connection and the weld seam thus produced can be subjected to loading immediately.

For the prior art, reference is made to DE 20 2018 001 178 U1, originating from the applicant.

DE 20 2018 001 178 concerns a device for avoiding an interruption of the welding process during the friction stir welding operation, in particular for avoiding breakage of the friction pin, which device has the following features:

a) at least three strip-like sensors (8), oriented at an angle of 120 degrees to one another, on the longitudinal sides of a wedge-shaped tool dome (7), the tool dome (7) guiding a welding pin (19) by means of a tool receiving cone (28) and a welding shoe (11), and the sensors (8) being designed for determining force, pressure and travel, b) a cone constriction in the lower region of the tool receiving cone (28), which serves for receiving a sensor (22) for detecting the axial force, the torque and the bending moment at the welding pin (19), c) a piezo vertical adjustment for the welding pin (19), d) an arrangement of a laser measuring sensor (10) in the region of the welding shoe (11), the directional effect of which passes over a round hole (27) in the passing-through region of the pin tip (12), an airborne sound sensor (3) being arranged opposite, and a welding shoe temperature sensor being provided, e) a sensor signal amplifier (23), with a rotor antenna for receiving, amplifying and passing on all of the measured values detected, these measured values being passed on to a machine controller by a static antenna (16), f) an inductive power supply system for supplying the measuring system from a moving secondary winding (24) and a fixed primary winding (25).

However, breakages of friction pins can occur during the operation of systems for friction stir welding as a result of local changes in the material within welding assemblies, for example due to variations in hardness in the case of cast materials.

The present invention is therefore based on the object not only of ensuring the economic operation of a system for friction stir welding, but also of increasing the welding speed thereof and the service life of the friction tool.

The object is achieved by the features of the device as claimed in claim 1:

a device for increasing the speed and increasing the stability of the welding pin in friction stir welding, said device having the following features:

a tool drive (1) bears a retaining flange (2) for a conical tool dome (3) with a union nut (4), an annular retaining ring (12) encloses a pin shank (6) with a tool shoe (7) which is fastened to the diameter of the retaining ring (12), wherein the tool shoe (7), in the region of the pin tip (10), has a smoothing and compacting surface (11) for smoothing the weld seam, wherein the pin shank has the width of the tool shoe (7) and the pin tip (10) has an annular friction surface (9) which surrounds a conveying screw (8) for the output of the material transport from the pin tip (10), the thread of which conveying screw runs counter to the thread of the pin tip (10), and in that provided to the side is a lifting device (18) for the possible swiveling of a rolling-roller arm (17) into the region of the abutment edge (1) of the parts (5) to be joined, and in that the half radius (15) of the smoothing and compacting surface (11) adjoins the pin shank (6) and in that the conveying screw (8) starts from the smoothing and compacting surface (1).

and the method as claimed in claim 5:

a method for increasing the speed and increasing the stability of the welding pin in friction stir welding, having the following features:

a tool drive (1) bears a conical tool drome (3), wherein a lifting device (18) of a rolling-roller arm (17) is provided in the region of the abutment edge (19) of the parts (5) to be joined, wherein the tool shoe (7) has a smoothing and compacting surface (11) for smoothing the weld seam, has an annular friction surface (9) which encloses a conveying screw (8) for the output of the material transport from the pin tip (10), the thread of which conveying screw runs counter to the thread of the pin tip (10), and in that the annular friction surface (9) heats the parts (5) to be joined by friction and thus increases the speed of the welding operation, wherein a slight burr is raised on the left and right sides that is however flattened by means of the rolling rollers (16), and in that the distance the breakaway edge (13) of the smoothing and compacting surface (11) from the pin shank (6) is optimized during the progression, and a computer program with a program code for carrying out the method steps when the program is executed in a computer, and a machine-readable carrier with the program code of a computer program for carrying out the method as claimed in, when the program is executed in a computer.

The device according to the invention and the underlying method are described in more detail below.

In the figures, specifically:

FIG. 1: shows a side view of the tool shoe according to the invention

Figure 2:
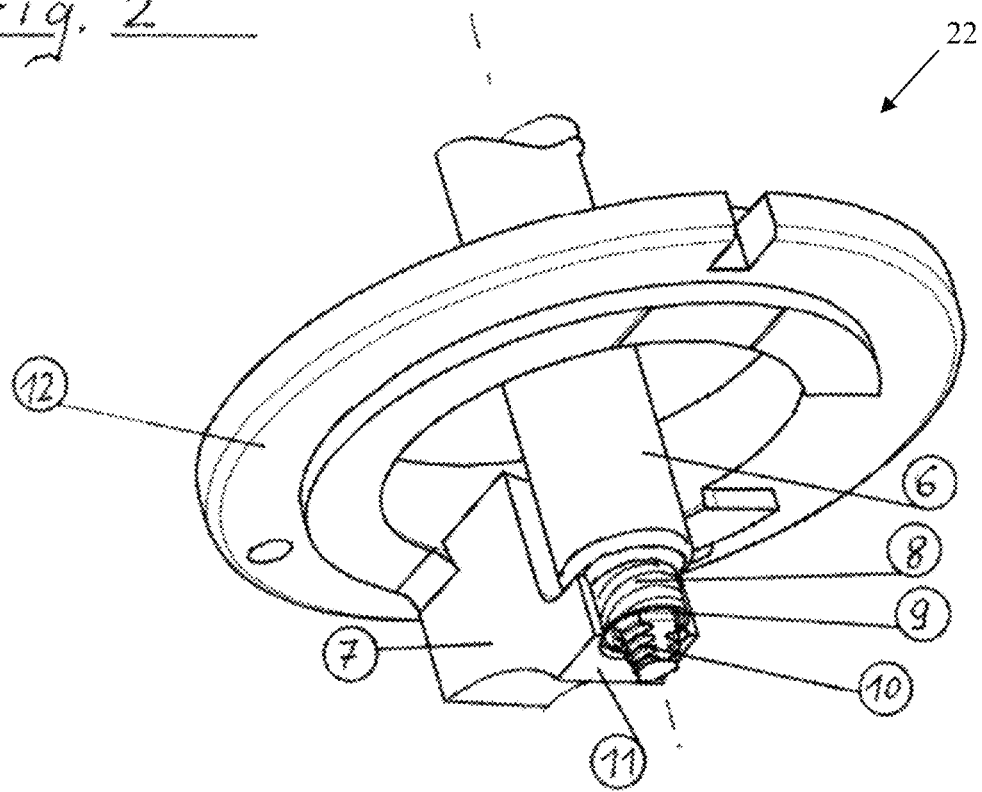

FIG. 2: shows an oblique view of the mount for the welding shoe

Figure 3:
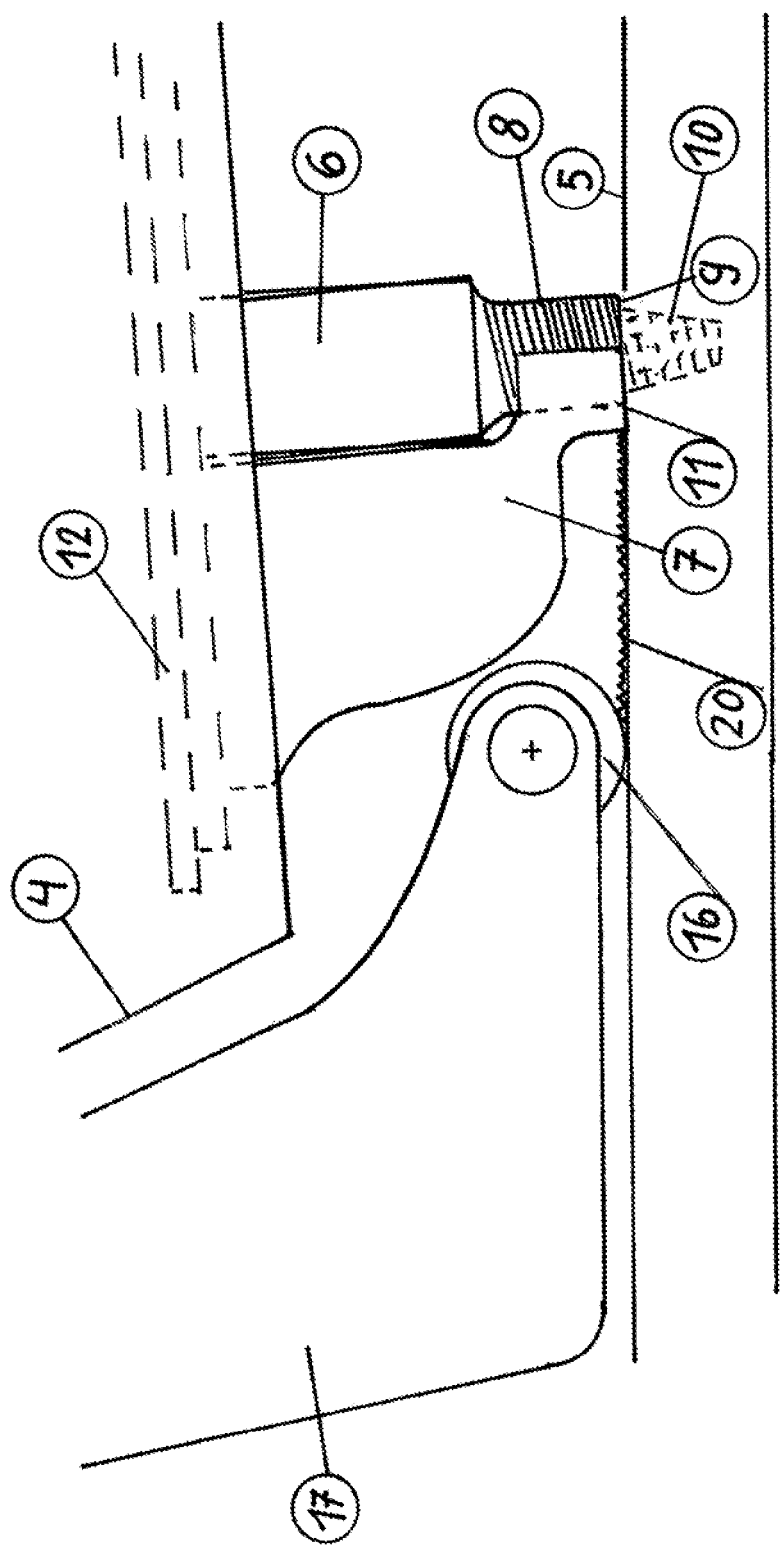

FIG. 3: shows a view of a detail from the region of the pin shank

Figure 4:
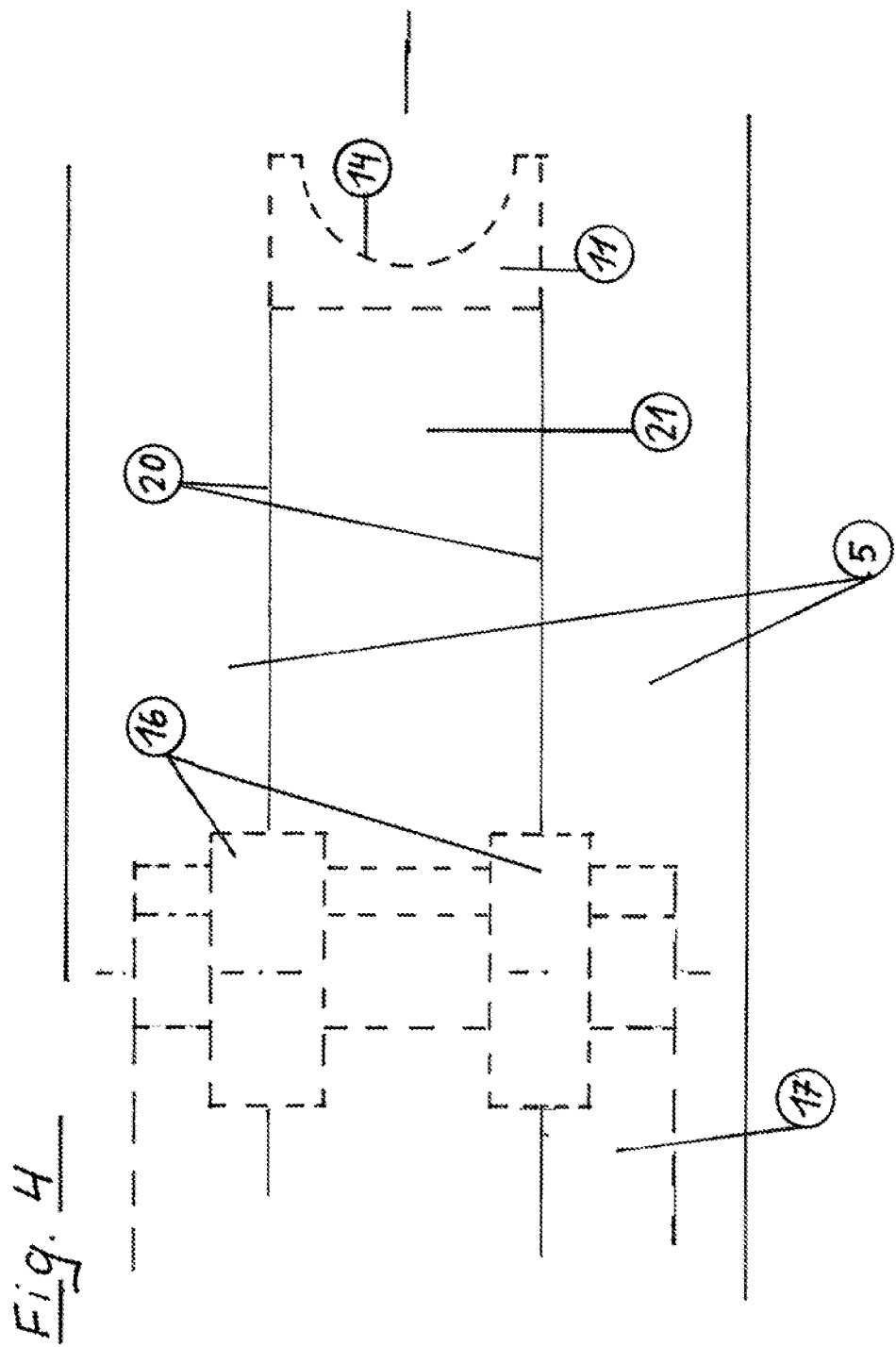
Figure 5:
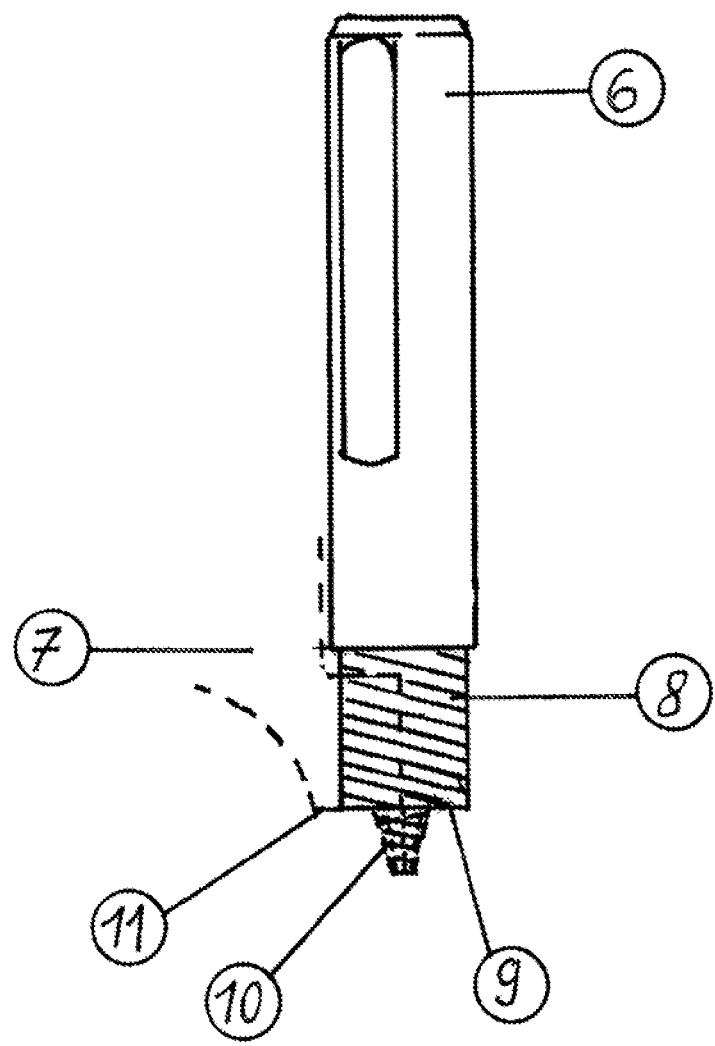

FIG. 4: shows a plan view of the running track in the region of the rolling rollers FIG. 5: shows an overall view of the pin shank FIG. 6: shows a plan view of the welding operation FIG. 1 shows a direct side view of the tool shoe (7). The retaining flange (2) for the conical tool dome (3) is driven from above by means of a tool drive (1).

The tool shoe (7) is fastened to the tool dome (3) via a union nut (4). Radial screws may also be used for this purpose.

The tool shoe (7) is shown with its pin shank (6) in direct engagement with the part (5) to be joined that is to be welded.

On the left-hand side, fastened to the retaining flange (2) for the tool dome (3), is a lifting device (18) for a rolling-roller arm (17) (or corresponding balls) which takes on the guidance of two rolling rollers (16) which run in parallel, fastened one (18) of which can be seen in the side view. The lifting device is regulated by piezo means, wherein the height or contact pressure of the rollers must be regulated independently of the actual process force regulation. In this way, the pressure of the rolling rollers can adapt to the burr that is produced, because an excessively high pressure would impress the rollers into the part to be joined, since the rollers press the parts to be joined within the heating zone (15) (see FIG. 6).

FIG. 2 shows an oblique view of the mount for the welding shoe (22).

The pin shank (6) guided by the annular retaining ring (12) of the welding shoe (22) bears the tool shoe (7) by way of its smoothing and compacting surface (11).

The pin shank (6), which runs out into the pin tip (10), before it reaches the pin tip (10) likewise bears a conveying screw (8) which has a counterclockwise thread and continually conveys the drainage material into the process zone, wherein the conveying screw (8) is surrounded in the lower region by a ring-shaped annular friction surface (9) at the level of the smoothing and compacting surface (11), which ring-shaped annular friction surface serves to heat the part(s) (5) to be joined. It would also be possible here to refer to a second and/or rotating remaining shoulder. As a result of conveying the drainage material downward by way of the conveying screw (8), the annular gap between the pin shoe radius (14) and the pin shank (6) is sealed upwardly. Drainage material is the term for the abraded material which is detached during the welding process from the parts (5) to be joined and is deposited on the pin (6).

FIG. 3 shows a view of a detail from the region of the pin shank. Here, the pin tip (10), which dips entirely into a part (5) to be joined, can be seen, wherein the smoothing and compacting surface (11) in the tool shoe (7) that impacts the part (5) to be joined obliquely, conventionally at an angle of 1.5 to 5 degrees, exerts its smoothing and compacting action on the part (5) to be joined, and, in the pin shank (6), the conveying screw (8) for transporting abraded material and the annular friction surface (9) for heating the part to be joined can be seen in their operation.

The retaining ring (12), which is depicted by dashed lines through the machine reconstruction, is known from FIG. 2.

The rolling-roller arm (17), known from FIG. 1, with a rolling roller (16) can be seen in cross section on the left-hand side of the tool shoe (7), similarly to the union nut (4), wherein burrs and unevennesses, also the weld seam edge, are outlined under the numeral (20) in the track of the rolling roller (16).

The smoothing and compacting surface (11) on the shoe results in the advantage of a low contact pressure of the tool and a faster welding speed. The contact pressure is specific to the tool and therefore fixed. On account of the small contact surface, the contact pressure is however considerable, but this means that welding can be performed faster at a given mechanical force. Indeed, produced as a result of this is a slight burr which is however slightly smoothed by the rolling rollers (in the transition region between the weld seam and the base material along the flanks of the welding shoe (22)).

FIG. 4: shows a plan view of the running track in the region of the rolling rollers (16) above the two parts (5) to be joined.

The two-part rolling-roller arm (17) with the weld seam edge (20) and the seam surface (21) can be seen from the top on the left-hand side, wherein the smoothing and compacting surface (11) can be seen with its radius (14), which encompasses the pin shank.

FIG. 5: shows an overall view of the pin shank.

The pin shank (6), which is illustrated perpendicularly in the center, allows the tool shoe (7), illustrated in dashed lines in a concealed manner, with its smoothing and compacting surface (11), mounted in the lower region, the annular friction surface (9) and the conveying screw (8) to be seen. The pin tip (10) can likewise be seen.

A faster welding speed and a longer service life of the tool follow from this configuration. Inter alia, by virtue of the reduced self-heating of the tool by the conveying screw (8), which reduces the internal friction.

FIG. 6 shows a plan view of the welding operation.

The curve (15) shows the heating zone of the actual welding operation, wherein the dashed center line (19) of FIG. 6 indicates the abutment edge of the parts (5) to be joined that are to be welded.

The two rolling rollers (16) smooth the unevennesses and/or weld seam edges (20).

The boundary lines of the welding shoe (22) from the top are identified by (7).

The smoothing surface (11) with its breakaway edge (13) encircles half of the surface (9) which is referred to as the friction surface for the heating of the parts to be joined.

The pin shank (6) with its pin tip (10) can be seen as the hub of the welding operation. The control of the welding process with its comprehensive regulation options requires a special computer program.

LIST OF REFERENCE SIGNS

1 Tool drive
2 Retaining flange for tool dome (cone)
3 Tool dome (cone)
4 Union nut for tool shoe
5 Part(s) to be joined
6 Pin shank
7 Tool shoe
8 Conveying screw for transporting abraded material (also referred to as a burr screw.)
9 Annular friction surface for heating the parts to be joined
10 Pin tip
11 Smoothing and compacting surface
12 Retaining ring for welding shoe
13 Breakaway edge
14 Pin shoe radius
15 Heat distribution curve
16 Rolling roller (or ball)
17 Rolling-roller arm
18 Lifting device for rolling-roller arm
19 Abutment edge of the parts to be joined
20 Burr, unevennesses, weld seam edge
21 Weld seam, seam surface
22 Welding shoe

The invention claimed is:

1. A method for increasing speed and stability of a welding pin in friction stir welding, the method comprising:
   positioning the welding pin on a workpiece to be welded, the welding pin being a portion of a tool drive;
   heating the workpiece by rotating the welding pin in contact with the workpiece and moving the tool drive relative to the workpiece to create a weld seam;
   pressing the weld seam with a tool shoe of the tool drive for smoothing and compacting the weld seam to create a welding burr, wherein the tool shoe includes (i) a concave portion that partially surrounds the welding pin and (ii) a smoothing and compacting surface that is located directly adjacent to the welding pin; and
   smoothing an unevenness of the welding burr by rolling a roller in a transition region between the weld seam and a base material of the workpiece along flanks of the tool shoe.

2. The method as claimed in claim 1, wherein
   an annular friction surface of the welding pin heats the workpiece to be joined by friction and thus increases the speed of the friction stir welding, and
   the welding burr is raised on left and right sides of the weld seam that is flattened by the roller.

3. The method for claim 1, further comprising optimizing a distance from a breakaway edge of the smoothing and compacting surface to the welding pin to provide the smoothing and compacting during the friction stir welding.

4. A computer program with a program code for carrying out the method steps as claimed in claim 1 when the program is executed on a computer.

5. A machine-readable carrier with program code of a computer program for carrying out the method as claimed in claim 1, when the program is executed on a computer.

6. The method as claimed in claim 1, wherein the roller presses the workpiece within a heating zone.

7. The method as claimed in claim 1, wherein a height or contact pressure of the roller is regulated independently of the pressing by the tool shoe.

8. The method as claimed in claim 1, wherein the tool shoe impacts the workpiece obliquely.

9. The method as claimed in claim 8, wherein tool shoe is at an angle of 1.5 to 5 degrees with respect to the workpiece.

10. The method as claimed in claim 1, wherein
    the tool drive includes a pin shank that extends to the welding pin,
    the pin shank turns a conveying screw surrounding the welding pin that has a counterclockwise thread and continually conveys drainage material into a process zone,
    the conveying screw is surrounded in a lower region by a ring-shaped annular friction surface at a level of the smoothing and compacting surface, and
    the ring-shaped annular friction surface heats the workpiece.

11. The method as claimed in claim 1, wherein the thread of the conveying screw is counter to a thread of the welding pin.

\* \* \* \* \*